US007860879B2

(12) United States Patent
Gerea et al.

(10) Patent No.: US 7,860,879 B2
(45) Date of Patent: Dec. 28, 2010

(54) SMO SCRIPTING OPTIMIZATION

(75) Inventors: Ciprian Gerea, Seattle, WA (US); Marius Popa, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 10/888,311

(22) Filed: Jul. 9, 2004

(65) Prior Publication Data

US 2006/0010106 A1 Jan. 12, 2006

(51) Int. Cl.
*G06F 17/30* (2006.01)
(52) U.S. Cl. .................... 707/769; 707/802; 707/809
(58) Field of Classification Search .............. 707/3, 707/769, 802, 809
See application file for complete search history.

(56) References Cited

U.S. PATENT DOCUMENTS

| | | | | | |
|---|---|---|---|---|---|
| 6,636,845 | B2 | 10/2003 | Chau et al. | ............ | 707/1 |
| 6,643,633 | B2 | 11/2003 | Chau et al. | ............ | 707/1 |
| 6,721,727 | B2 | 4/2004 | Chau et al. | ............ | 707/3 |
| 7,107,589 | B1 * | 9/2006 | Tal et al. | ............ | 717/177 |
| 2003/0014397 | A1 | 1/2003 | Chau et al. | ............ | 707/3 |
| 2003/0208505 | A1 * | 11/2003 | Mullins et al. | ............ | 707/102 |
| 2004/0010775 | A1 * | 1/2004 | Matsa et al. | ............ | 717/116 |
| 2004/0015782 | A1 * | 1/2004 | Day et al. | ............ | 715/517 |
| 2004/0022379 | A1 * | 2/2004 | Klos et al. | ............ | 379/201.01 |
| 2004/0073565 | A1 * | 4/2004 | Kaufman et al. | ............ | 707/101 |
| 2005/0021924 | A1 * | 1/2005 | Bergen et al. | ............ | 711/173 |
| 2005/0278709 | A1 * | 12/2005 | Sridhar et al. | ............ | 717/136 |

OTHER PUBLICATIONS de Brum Saccol, D. et al., "Integration of XML Data", *Efficiency and Effectiveness of XML Tools and Techniques and Data Integration over the Web, Lecture Notes in Computer Science*, 2003, 2590, 68-80.
Gourber-Pace, M. et al., "Objectives and Status of the ABS Database for the PS Complex", *Workshop on Automated Beam Steering and Shaping (ABS)*, 1999, p. 108.
Liming, M. et al., "A Tree-Structured Database Machine for Very Large Relational Database Systems", *Proceedings of the 7th International Conference on Automation in Warehousing*, 1986, 241-245.
Marron, P. J. et al., "Efficient Cache Answerability for XPath Queries", *Efficiency and Effectiveness of XML Tools and Techniques and Data Integration over the Web*, 2002, 2590, 183-199.
Shin, H. et al., "An XPath Reduction Algorithm for Fast Querying of Digital Libraries in XML", *Digital Libraries: Technology and Management of Indigenous Knowledge for Global Access. 6th International Conference on Asian Digital Libraries, Lecture Notes in Computer Science*, 2003, 2911, 275-280.

* cited by examiner

*Primary Examiner*—Hosain T Alam
*Assistant Examiner*—Johnese Johnson
(74) *Attorney, Agent, or Firm*—Woodcock Washburn LLP

(57) ABSTRACT

A method and system is described herein for populating an object tree with data obtained from a relational data store. One query is issued to retrieve data for each object in a given level of the object tree. The data is stored in a table in an order, which corresponds to an order in which the objects of the object tree will be initialized. The data is read from the table in the order, and the corresponding object in the tree is initialized.

29 Claims, 9 Drawing Sheets

SMO SCRIPTING OPTIMIZATION

FIELD OF THE INVENTION

The present invention is related to relational databases. More particularly, the present invention is related to an optimization method for populating a tree from a relational data store having a known structure.

BACKGROUND OF THE INVENTION

One type of electronic information storage system is a relational database. Data records in a relational database management system are maintained in tables, which are a collection of rows all having the same columns. Each column maintains information on a particular type of data for the data records that comprise the rows. One or more indexes may be associated with each table. An index is an ordered set of pointers to data records in the table based on the data in one or more columns of the table. An index is comprised of rows or index entries that include an index key and a pointer to a database record in the table having the key column values of the index entry key. An index key comprises key columns that provide an ordering to records in a table. The index key columns comprise the columns of the table, and may include any of the values that are possible for that particular column. Columns that are used frequently to access a table may be used as key columns.

The information contained in a relational database is referred to as being "flat." In other words, the data in such a database is not hierarchically organized. Any relationships between the data is defined by pointers and the like. In contrast, the object-oriented programs that often interact with relational databases are not adapted to interpret and use flat data. Instead, object-oriented programs hierarchically organize data objects into classes. An example of hierarchically organized data is a data object "tree," where the relationships between the data objects are represented by the object's position in the tree. Thus, the flat data contained in the database needs to be converted into a form that can be accessed programatically if an object-oriented program is to properly interact with the data contained in the relational database.

From the standpoint of an object-oriented software developer, it is desirable to know the schema of a particular relational database for purposes of rendering the database's flat data useable to an object-oriented program. The schema is a definition of all or part of a database. For example, the schema defines the structure, the type of contents that can be in each data object within the structure, and relationships between the objects. Importantly, for development purposes, the schema provides all the information necessary for a developer to create software code that will be able to interact with the database. The actual data content (e.g., the instances of a particular class) stored in the database is irrelevant for this purpose and would slow the development process if the content had to be handled and transmitted. The schema is described by database server metadata that is stored in a relational data store. The relational data store consists of tables that contain metadata about database objects.

MICROSOFT SQL SERVER, for example, is a comprehensive database management platform that provides extensive database management and development tools, a powerful extraction, transformation, and loading (ETL) tool, business intelligence and analysis services, and other capabilities. To enable deployment of a database solution from a development server to a production server, it is necessary to generate a SQL creation script for existing database objects. The creation script, if applied, recreates the schema of the original database, or the portions of the original database, that was scripted. Because of this feature, the creation script helps to transfer the database metadata between servers. The generation of such a creation script is commonly referred to as "scripting the schema." The "deployment" of a solution typically means that the database schema of the production server is identical to that of the development server, because database developers use the development server to test for more efficient schemas. In some applications, deployment means only applying small changes to the schema, while in other applications, as noted above, the entire schema is copied.

An intermediate step in the process of generating a creation script is to create an object tree model that is populated with the database server metadata from the relational data store. The populated tree is used to represent the manageable entries contained in a database server, along with the entities' associated metadata. The tree is a necessary intermediate step in the creation script generation process because, as noted above, object-oriented programs are not adapted to interpret the metadata contained in the relational data store without the additional hierarchy information provided by the tree structure. Thus, the populated tree permits programmatic access to the metadata to generate the creation script because the metadata has been transformed into a format that is accessible to an object-oriented program.

Conventional processes for creating a tree object model are slow and processor-intensive because they issue a large number of queries to obtain the necessary schema information. In the SQL SERVER world, the Distributed Management Objects (DMO) management library implements one such conventional scripting process. For example, as the methodology employed by the DMO "walks" through the tree, a query is issued every time a lower level of an object in the tree needs to be populated. Programmatically, this is done by querying the database whenever a node (object) in the tree is accessed and not fully initialized. Thus, this conventional process issues a number of queries that is proportional to the number of objects stored in the database, which causes the process to become slower as the number of objects becomes larger. As a result, such a conventional scripting method is not easily scalable because the method becomes less and less efficient as the amount of data to be scripted increases.

What is needed, therefore, is a scalable method of scripting a database schema that issues a number of queries that is not proportional to the number of objects in a database, thereby increasing the speed and reducing the complexity of the tree population and, therefore, scripting process. More particularly, what is needed is a scripting method that leverages prior knowledge of the tree structure to more efficiently query the data store by only issuing one query for every type of object, regardless of the number of objects of a particular type.

SUMMARY OF THE INVENTION

In view of the above shortcomings and drawbacks, a method and system is described herein for populating an object tree with data obtained from a relational data store. In the method, one query is issued to retrieve data for each object type in a particular level of the object tree. The data is stored in a table in an order, which corresponds to an order in which the objects of the object tree will be initialized. The data is read from the table in the order, and the corresponding object in the tree is initialized. If the data is read from the table and no corresponding object is present in the object tree, then the object is first created and then initialized with the data.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Figure 1:
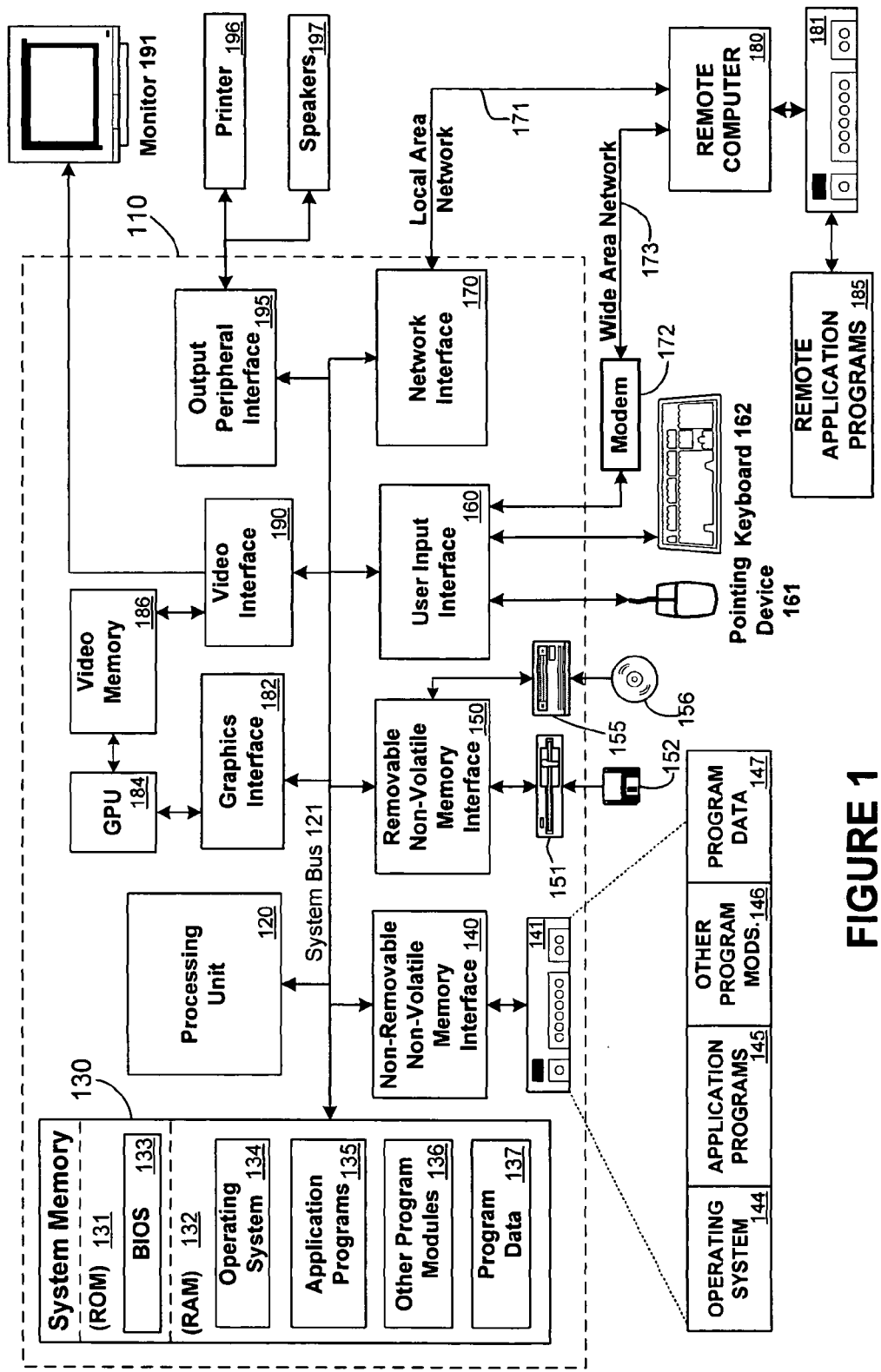
FIG. 1 is a diagram illustrating an exemplary computing environment in which aspects of the invention may be implemented.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

The generation of a SQL creation script for a particular application comprises three conceptual steps: (1) query the relational tables that contain data for the objects that are to be scripted, (2) store the query results in a tree, and (3) generate a creation script for every object that is needed in the application. An embodiment of the present invention performs steps (1) and (2) in a manner that is both scalable and efficient. It will be appreciated that any manner of completing step (3) using the created tree is equally consistent with an embodiment of the present invention.

One embodiment of the present invention leverages advance knowledge of the tree structure to efficiently generate queries. In such an embodiment, and because the structure of the tree is known, one query is issued for every desired type of database object, regardless of the number of objects of that type. Thus, one query is needed to obtain the appropriate data for a given level of the tree for which a creation script is to be generated. Because the number of queries is not dependent on the number of objects present in the database, an embodiment of the present invention provides the scalability that has been lacking in conventional methods.

The query results, in an embodiment, are stored in a query results table in a manner that forms a particular order. The order is chosen so that, as the method walks through the tree, the results can be scanned from the results table at the same time the method is at the node of the tree where the results will be placed. Thus, the node can be efficiently initialized with the appropriate data contained in the query results. If there is no node at a location where the query results indicate one should be located, the missing node is created and initialized using the appropriate data. The synchronized walking/initialization of the tree and scanning of the query results that is enabled by the ordered arrangement of the query results in the query results table increases processing efficiency and speed. As was noted above, once the tree is initialized to the desired depth, any method for generating a creation script may be used, and any such method is equally consistent with an embodiment of the present invention.

Before discussing the invention in detail, we will first describe exemplary computing and network environments in which the invention may be advantageously practiced.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Network Environment

Figure 2A:
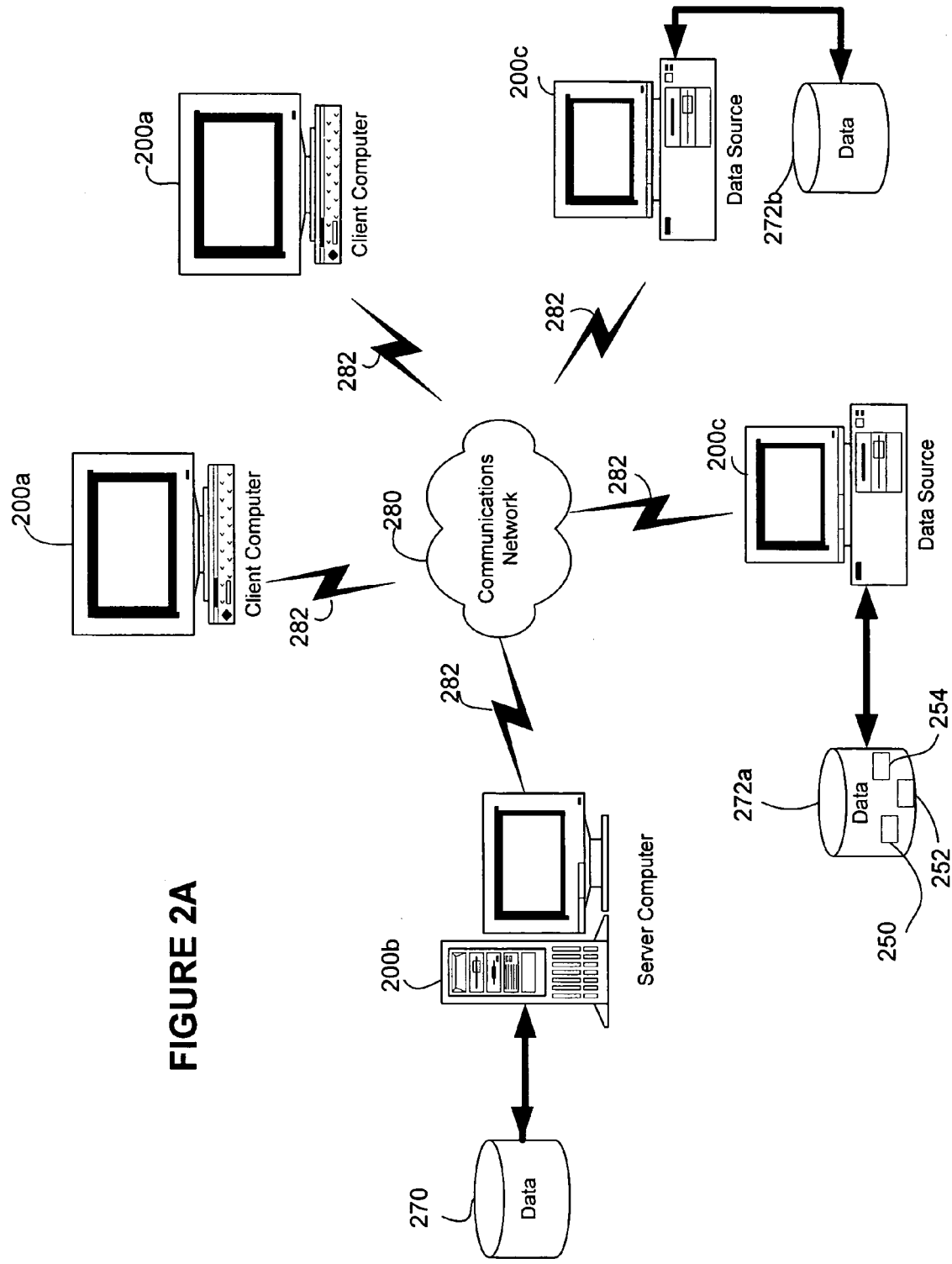
FIG. 2A is schematic diagram representing a network in which aspects of the present invention may be incorporated.

FIG. 2A illustrates an exemplary network environment in which the present invention may be employed. Of course, actual network and database environments may be arranged in a variety of configurations; however, the exemplary environment shown here provides a framework for understanding the type of environment in which the present invention operates.

The network may include client computers 200a, a server computer 200b, data source computers 200c, and databases 270, 272a, and 272b. The client computers 200a and the data source computers 200c are in electronic communication with the server computer 200b by way of the communications network 280 (e.g., an Intranet). Client computers 200a and data source computers 200c are connected to the communications network by way of communications interfaces 282. Communications interfaces 282 can be any type of communications interfaces such as Ethernet connections, modem connections, wireless connections and so on.

Server computer 200b provides management of database 270 by way of database server system software, described more fully below. As such, server 200b acts as a storehouse of data from a variety of data sources and provides that data to a variety of data consumers.

In the exemplary network environment of FIG. 2A, data sources are provided by data source computers 200c. Data source computers 200c communicate data to server computer 200b via communications network 280, which may be a LAN, WAN, Intranet, Internet, or the like. Data source computers 200c store data locally in databases 272a, 272b, which may be relational database servers, excel spreadsheets, files, or the like. For example, database 272a shows data stored in tables 250, 252, and 254. The data provided by data sources 200c is combined and stored in a large database such as a data warehouse maintained by server 200b.

Client computers 200a that desire to use the data stored by server computer 200b can access the database 270 via communications network 280. Client computers 200a request the data by way of SQL queries (e.g., update, insert, and delete) on the data stored in database 270. It will therefore be appreciated that any configuration of computers is equally compatible with an embodiment of the present invention.

Exemplary Database Architecture

Figure 2B:
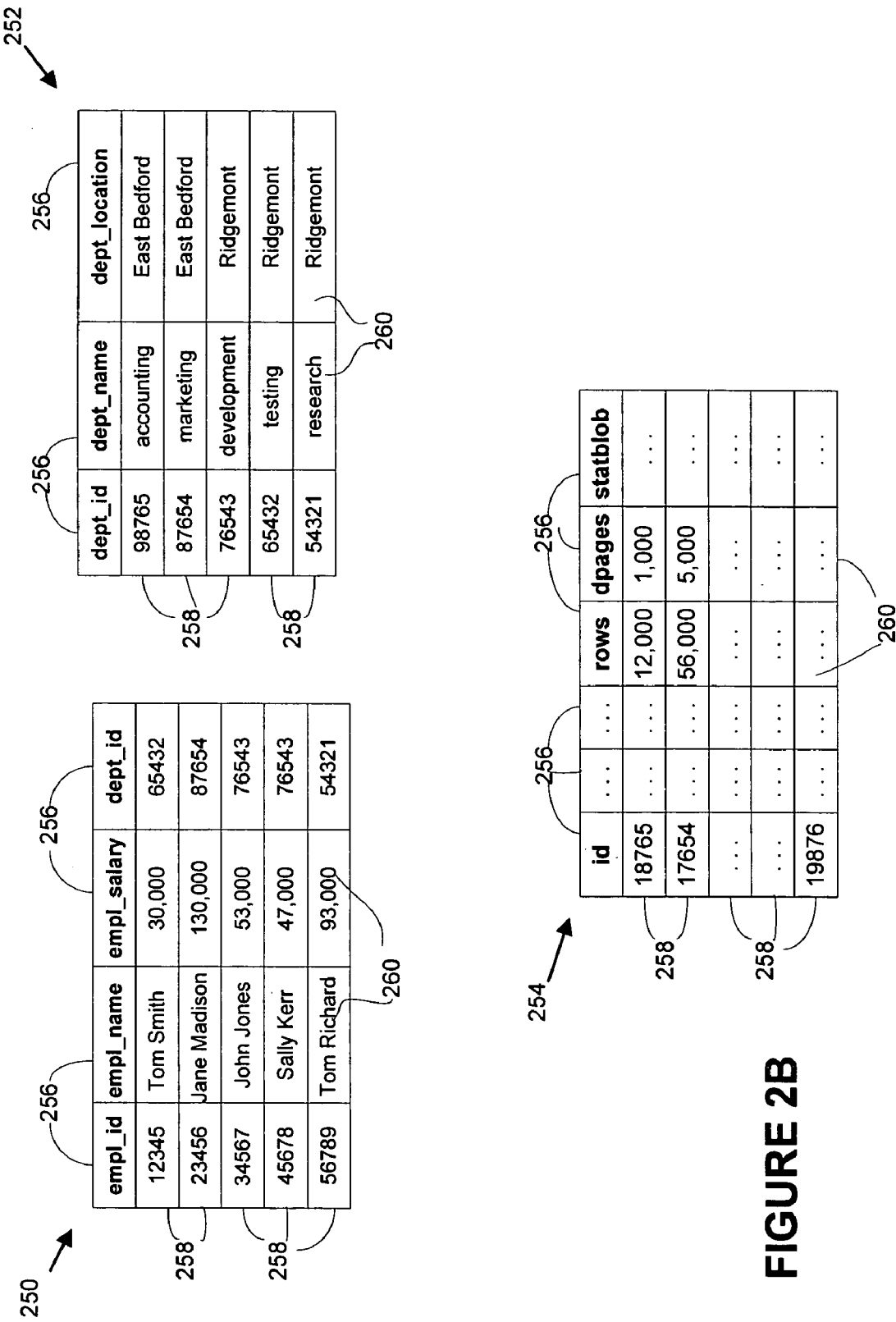
FIG. 2B is a diagram illustrating exemplary database tables in which aspects of the invention may be implemented.

A database is a collection of related data. In one type of database, a relational database, data is organized in a two-dimensional column and row form called a table. FIG. 2B illustrates tables such as tables 250, 252, and 254 that are stored in database 272a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

As shown in FIG. 2B, the exemplary database 272a comprises employee table 250, department table 252, and sysindexes table 254. Each table comprises columns 256 and rows 258 with fields 260 formed at the intersections. Exemplary employee table 250 comprises multiple columns 258 including empl_id, empl_name, empl_salary, and dept_id. Columns 258 in department table 252 include dept_id, dept_name, and dept_location. Sysindexes table 254 contains information regarding each table in the database.

Generally, data stored in a relational database is accessed by way of a user-defined query that is constructed in a query language such as SQL, or in managed code such as, for example, Visual Basic .NET, C# or the like. Typically, for any given SQL query there are numerous procedural operations that need to be performed on the data in order to carry out the objectives of the SQL query. For example, there may be numerous joins and table scans that need to be performed so as to accomplish the desired objective.

Tree Structure

Figure 3A:
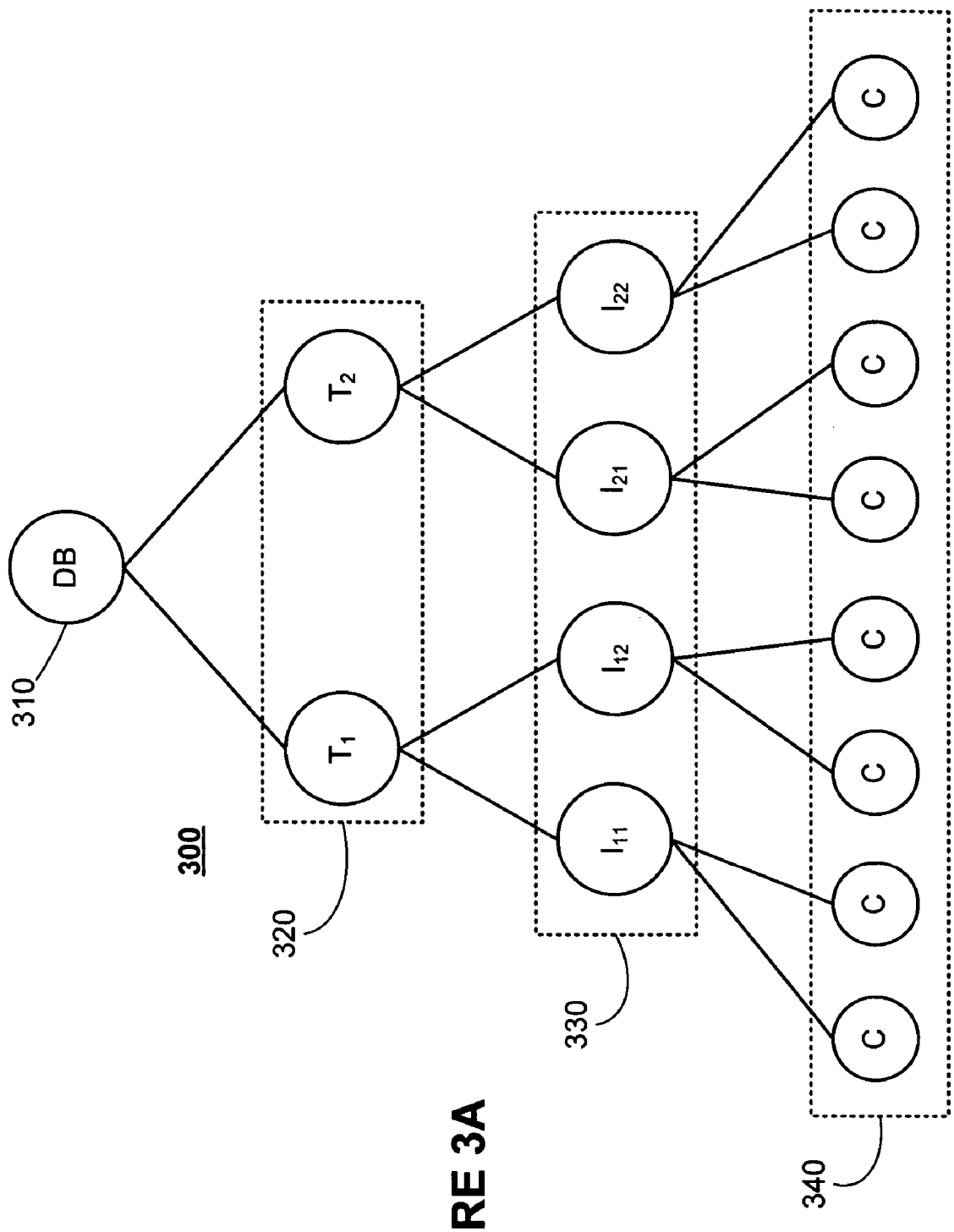
FIG. 3A is a diagram illustrating an exemplary tree in which aspects of the invention may be implemented.

Referring now to FIG. 3A, a diagram illustrating an exemplary object tree in which aspects of the invention may be implemented is shown. The tree 300 represents the relationships between data objects in a relational database from an object-oriented viewpoint and each object is represented as a node in the tree 300. As can be seen in FIG. 3A, the tree 300 shown represents the structure of a database 310. Database 310 may have one or more tables 320 such as, for example, tables $T_1$ and $T_2$. Each table 320, in turn, may have one or more indexes 330 such as, for example, indexes $I_{11}$ and $I_{12}$, which are children of table $T_1$, and indexes $I_{21}$ and $I_{22}$, which are children of table $T_2$. Furthermore, each index 330 can comprise one or more columns 340 of data. Additional objects may be located under the columns (such objects are not shown in FIG. 3A, for clarity), and such objects may be described by default constraints and the like. It will be appreciated that the relationship between the objects in the tree 300 is relatively stable. In other words, the children of a database 310 are tables 320, the children of tables 320 are indexes 330, the children of indexes 330 are columns 340, and so forth. Thus, while the exact number and depth of related objects of, for example, table $T_2$ may not be known in advance of a query, the types of data objects that can be related to table $T_2$ can be known in advance (e.g., table T2 can have a database 310 parent, and an index 330 child and column 340 grandchild).

DMO Solution

Figure 3B:
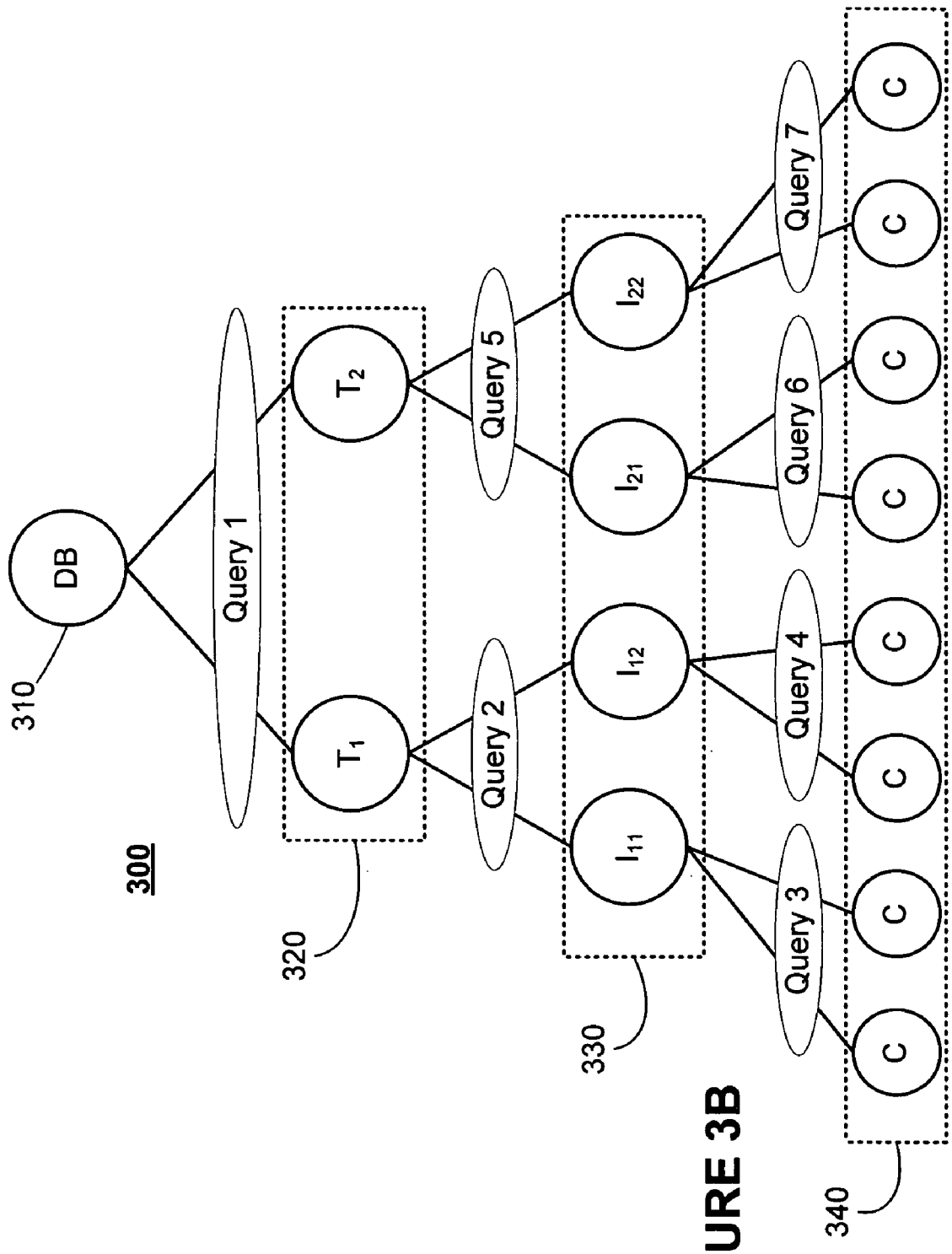
FIG. 3B is a diagram illustrating a conventional query methodology.

For purposes of describing an embodiment of the present invention, a conventional tree population method is first described for comparison purposes. Turning now to FIG. 3B, a diagram illustrating such a conventional query methodology is shown. FIG. 3B contains a tree 300 having a database 310, tables 320, indexes 330 and columns 340 as was discussed above in connection with FIG. 3A. As noted above, the tree structure should be populated with metadata pertaining to the database objects that are relevant in the schema scripting process.

DMO code implements one such conventional query methodology to populate a tree. DMO structures the database objects internally in a tree 300 that aggregates the objects based on their database server counterparts. For example, from a query-issuing perspective, the DMO population methodology is essentially a depth-first search ("DFS") walk of the object tree 300. Whenever, the methodology needs to populate the lower level of an object it issues one query. Programmatically this is done by instructing a collection module to issue a query whenever a node is accessed and is not fully initialized. For example, if database 310 is not fully initialized, a query, such as query 1, is issued to obtain metadata pertaining to tables $T_1$ and $T_2$. Continuing to walk through the tree 300 in DFS order, if table $T_1$ is not fully initialized, query 2 is issued to obtain metadata pertaining to indexes $I_{11}$ and $I_{12}$, query 3 obtains metadata for columns 340, and so forth. It can be seen that the number of queries that need to be performed to fully populate the tree 300 is proportional to the number of objects stored in the database. Thus, the methodology becomes very slow and processor-intensive as the number of database objects increases.

For example, if the entire tree 300 as shown in FIG. 3B were to be populated, all seven queries 1-7 would need to be executed. If another level of data objects below the columns 340 (not shown in FIG. 3B for clarity) are to be populated, it can be seen that another eight queries would be required—one query for each of the eight columns 340, bringing the total number of queries to 15. It will readily be appreciated that as the database objects become richer with related objects, the number of levels and, therefore, the number of queries required to fully populate the tree 300 will increase rapidly.

Description of Embodiments of the Present Invention

Figure 3C:
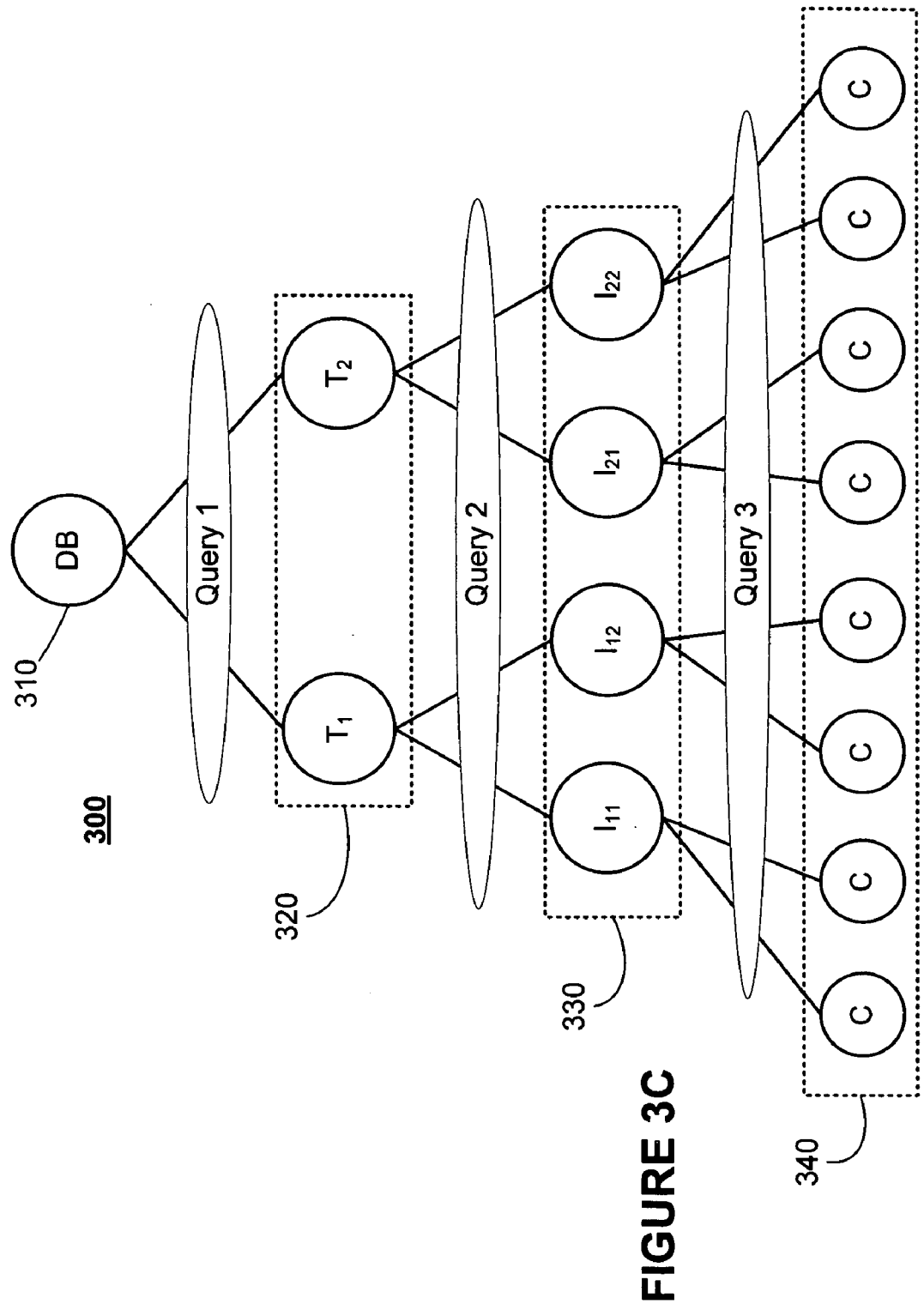
FIG. 3C is a diagram illustrating a query methodology according to an embodiment of the present invention.

Accordingly, and referring to FIG. 3C, a query methodology according to an embodiment of the present invention is now discussed. It will be appreciated that one embodiment of the present invention is implemented as part of the SQL SERVER Management Objects (SMO) management library that is part of SQL SERVER. The SMO can be configured as part of a client-side Application Program Interface (API), a stand-alone program, a computer-readable medium, or it may be configured in any other manner while remaining consistent with an embodiment of the present invention. For the sake of clarity, a typical SMO embodiment is discussed herein in connection with FIGS. 3C and 4-6. However, the present invention is in no way limited to any SMO embodiment, as an embodiment of the present invention may be implemented in any number of different configurations and environments. Furthermore, while the discussion that follows refers to metadata, it will be appreciated that any type of data relating to the data objects may be used in connection with an embodiment. Thus an embodiment of the present invention may be used to populate any type of tree.

FIG. 3C contains a tree 300 having a database 310, tables 320, indexes 330 and columns 340 as was discussed above in connection with FIG. 3A. As was also discussed above in connection with FIG. 3A, it is known in advance what type of objects any node can have as children. When creating queries, therefore, an embodiment exploits the relational nature of the database metadata store: all objects of the same type are stored in the same table and/or is obtainable with the same query. Therefore, a query issued according to an embodiment requests metadata pertaining to all objects of a certain class. Thus, it can be seen that to obtain metadata pertaining to the children of the database 310, a single query (query 1) is able to obtain the metadata for tables $T_1$ and $T_2$. Likewise, a single query (query 2) is able to obtain the metadata for all of the indexes $I_{11}$, $I_{12}$, $I_{13}$ and $I_{14}$. Finally, query 3 obtains the metadata for all of the columns 340.

Thus, compared to the methodology employed above in connection with FIG. 3B, which required seven queries to populate the tree 300, the methodology of FIG. 3C requires only three queries. In addition, if another level of data objects below the columns 340 (not shown in FIG. 3C for clarity) are to be populated, it can be seen that only one more query would be required, which only brings the total number of queries to four. It will be appreciated that an embodiment—in addition to exploiting the relational nature of the metadata store—further takes advantage of the fact that the entire tree 300 is to be populated. This, for example, permits the queries 1-3 to return metadata for an entire level of the tree 300 without returning unneeded results. An embodiment is equally applicable to applications where metadata is to be obtained for all objects on every level of a database 310, as well as to application where metadata is obtained only for selected levels of the database 310.

It will further be appreciated that the total quantity of query results—the metadata of the objects—is the same as would be returned using the methodology of FIG. 3B. Significantly, however, far fewer queries are required to return such metadata using the methodology of FIG. 3C, which provides processing and speed advantages. In addition, the use of a fixed number of queries that is determined by the type of metadata that needed in a tree provides improved scalability.

As noted above in the Overview, an embodiment of the present invention queries the relational tables that contain metadata for the objects that are to be scripted, and also stores the query results in a tree that is programmatically accessible to an object-oriented creation script generation program. Thus, an embodiment stores the results of the queries 1-3 in a tree structure for use by such a creation script. In an embodiment, the tree 300 that is used by the SMO is soted in an internal memory structure of the SMO. It will be appreciated that any type or location of memory in which storage and interaction with the tree 300 is equally consistent with an embodiment.

Figure 4:
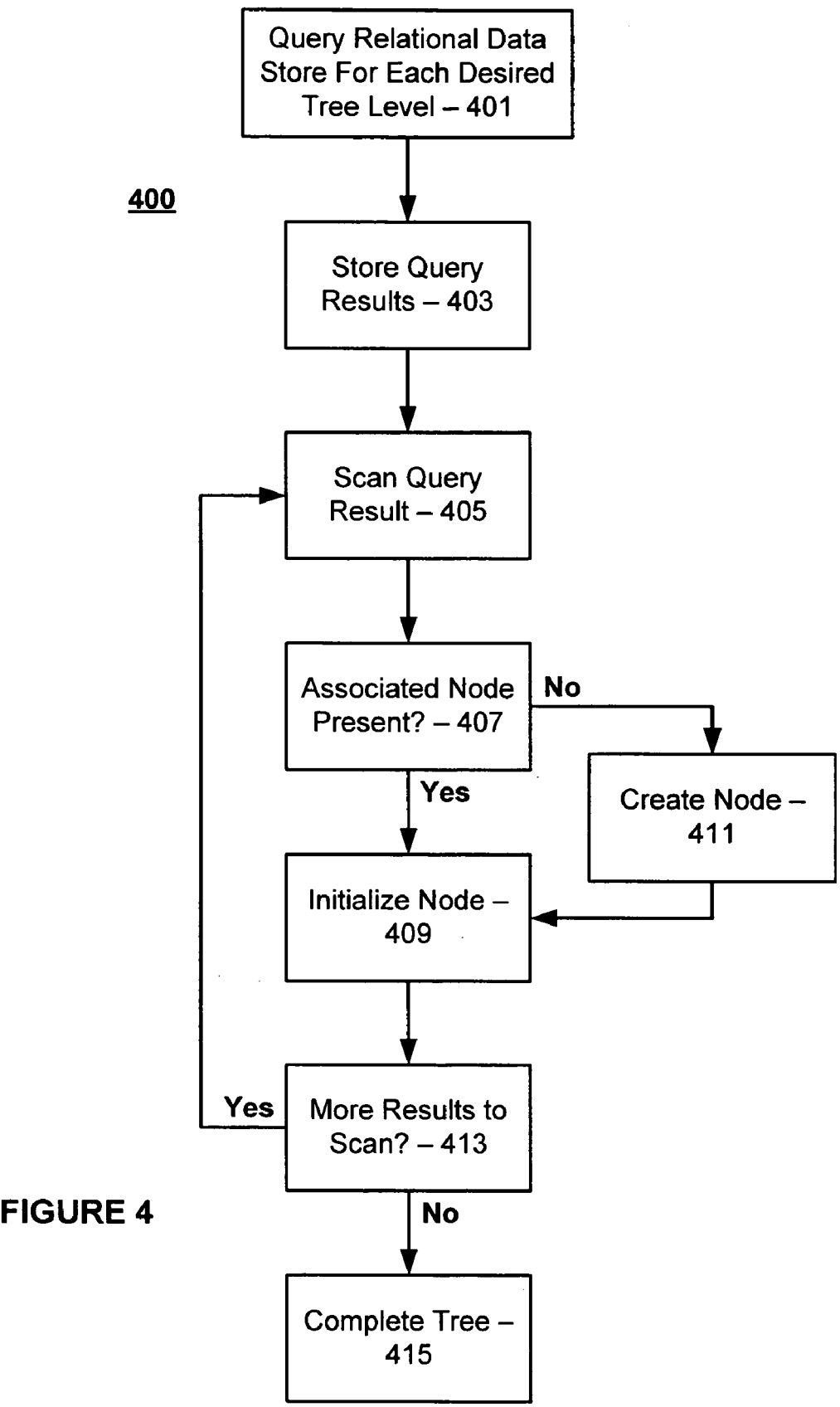
FIG. 4 is a flowchart illustrating an optimized method of populating a tree according to an embodiment of the present invention.

Referring now to FIG. 4, a flowchart illustrates an optimized method 400 of populating a tree according to an embodiment of the present invention. At step 401, the relational data store is queried for each desired tree level. For example, as was discussed above in connection with FIG. 3C, a total of three queries would be issued for the tree 300. At step 403, the results of the query (i.e., the metadata describing each object at a tree level) are stored in a query result table. The result storage of step 403 will be discussed in detail below in connection with FIGS. 5 and 6. In addition, steps 405-413 are also discussed in detail below in connection with FIGS. 5 and 6.

At step 405, the query result contained in the query result table is scanned, and at step 407, a determination is made as to whether a corresponding node is present in the tree. If the result of the determination of step 407 is that there is no corresponding node, a node is created at step 411. It will be appreciated that the node to be created at step 411 will be an object that is the appropriate type for the particular level of the tree at which the node resides. If the determination of step 407 is that there is a corresponding node, then at step 409 the node is initialized. Step 409 also takes place at the completion of step 411. Initialization is the process by which the metadata obtained by way of the one or more queries of step 401 is placed into the tree, thereby representing the flat data of the relational database as a hierarchy that is understandable to an object-oriented program.

At step 413, a determination is made as to whether any further query results are to be scanned. If there are more results, then the method 400 returns to step 405. Otherwise, the method 400 completes at step 415. It will be appreciated that at or after step 415 a creation script may be generated for the data in the now-populated tree. As was noted above, any such creation script generation process is equally compatible with an embodiment of the present invention.

Figure 5:
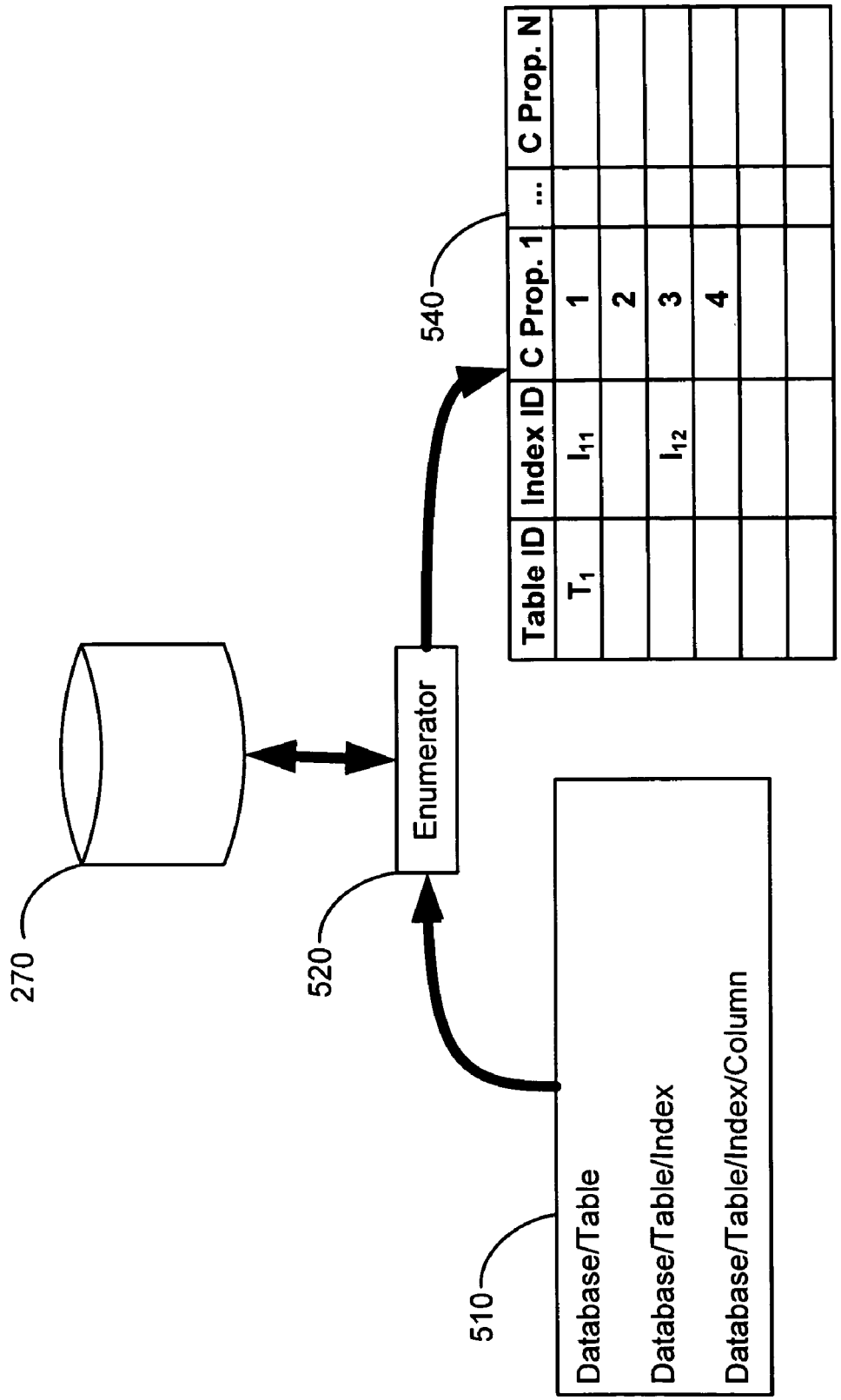
FIG. 5 is a diagram illustrating a database querying configuration according to an embodiment of the present invention.

Certain details of the method 400 are discussed now in connection with FIG. 5, which illustrates an exemplary query 510. As can be seen, query 510 uses XPath syntax, although any type of syntax is consistent with an embodiment. In an embodiment, a subset of the Xpath syntax is used, along with syntax additions as are described herein. The query 510, in the exemplary case of FIG. 5, actually contains three separate queries: Database/Table, Database/Table/Index and Database/Table/Index/Column. For example, Database/Table refers to a query that is requesting the metadata associated with database tables, such as tables 320 discussed above in connection with FIGS. 3A-C.

While the query 510, in some embodiments, could be submitted to the database 270 directly using different syntax, in one embodiment the SMO uses a software component, the enumerator 520, to take the XPath syntax query 510 to describe a metadata query. Such a component is discussed in commonly-assigned U.S. patent application Ser. No. 10/376, 176, filed Feb. 28, 2003, titled "System and Method for Generating a Request for Information About Selected Objects," the contents of which is hereby incorporated by reference in its entirety. The enumerator 520 generates SQL queries based on the XPath queries 510 to return the desired metadata results. For example, the enumerator 520 would take the "Database/Table" XPath query 510 and generate an appropriate SQL query to return the desired metadata. The caller of the query 510 can specify properties for every level in the XPath, as well as a sorting order. This mechanism enables the SMO to initialize only parts of the tree if so desired.

The query 510, by way of the enumerator 520, is submitted to database 270. It will be appreciated that the database 270 is used generically, as the relational data store of such a database may be the data source that is actually queried, depending on the particular configuration of the database 270. It will also be appreciated that any configuration of a database, data store, and the like is equally consistent with an embodiment of the present invention. The results of the query, which is the metadata for the designated object types, is stored in a query results table 540. In one embodiment, the query results table 540 is stored in a memory structure that is internal to the SMO. Again, it will be appreciated that any memory location or arrangement is equally consistent with an embodiment of the present invention. In one embodiment, the results of the query are received by the enumerator 520. The enumerator 520 then stores the data in the query response table 540. The enumerator 520, in some embodiments, may perform additional functions on the query results as needed or desired.

As can seen in the exemplary data of the query results table 540, metadata such as "Table ID," "Index ID," "Column Properties," and so forth is stored therein. Any number of properties may be stored in the table 540. For example, "Column Properties" 1 through N signifies that any number of column properties may be stored. In addition, any number of rows A-N may be stored in the table 540. It can be seen that row A contains metadata corresponding to tree 300 objects table $T_1$, index $I_{11}$ and column 1. To initialize an entire tree level, the query results should contain information about the parent(s) of that level, so the objects of a given level of the object tree can be properly placed. Thus, and as is shown in FIG. 5, a query for index columns contains information about the table and index in each row. As a result, the metadata can be placed in the proper node of a tree when the tree is being populated.

Figure 6:
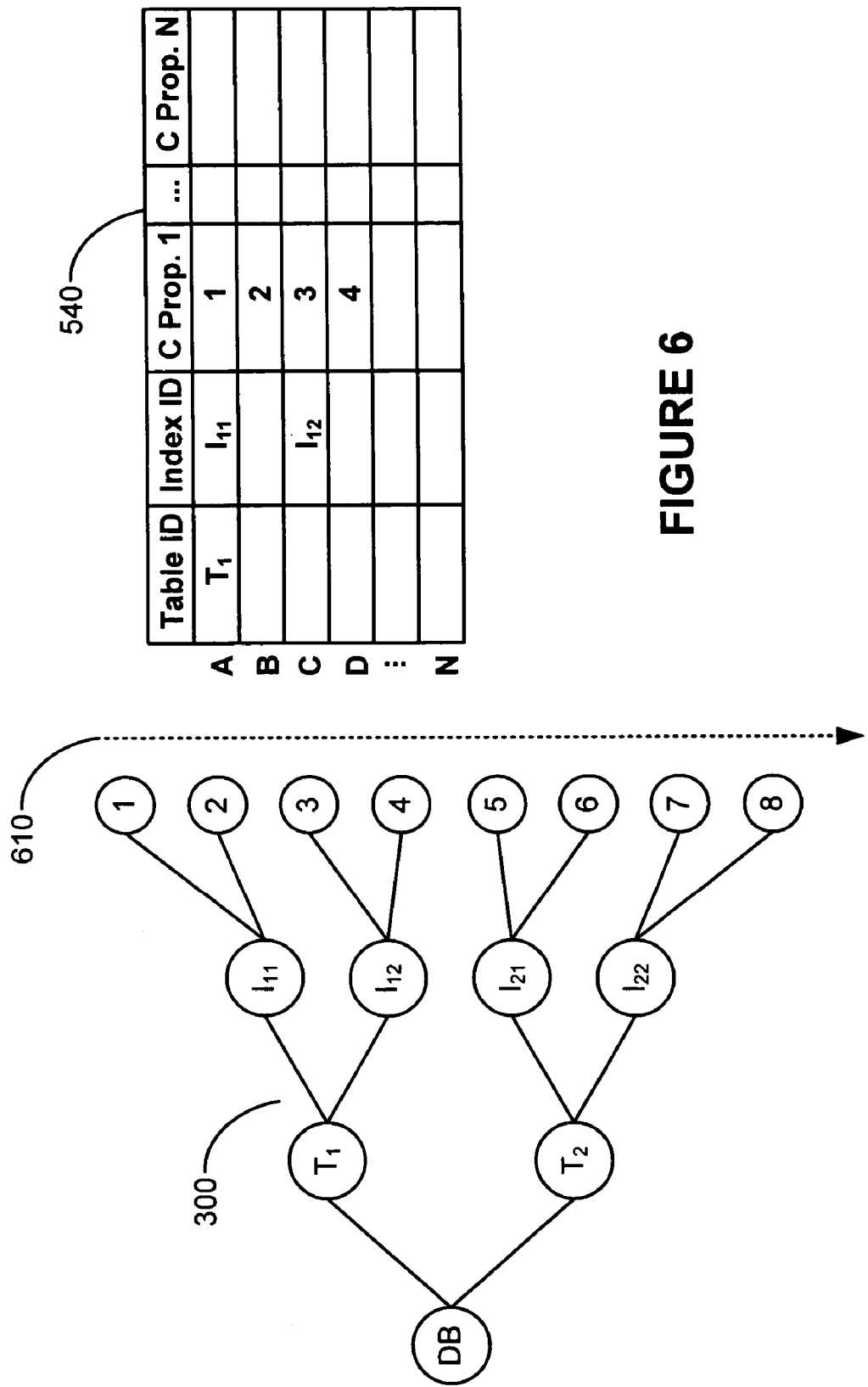
FIG. 6 is a diagram illustrating tree population according to an embodiment of the present invention.

To illustrate such a population process, we turn now to FIG. 6, which shows a diagram illustrating tree population according to an embodiment of the present invention. As can be seen in FIG. 6, tree 300 has the same exemplary configuration as tree 300 discussed above in connection with FIGS. 3A-C. Likewise, the query results table 540 is configured as was discussed above in connection with FIG. 5. Arrow 610 indicates the direction the tree 300 is populated. As can be seen, the direction indicated by arrow 610 loosely corresponds with a DFS walk of the tree 300. It will be appreciated that "walking" conventions other than DFS may be employed in an embodiment of the present invention. In such embodiments, the metadata stored in the query results table 540 should be stored and/or read in an order that corresponds to the order of the walk through the tree 300.

For purposes of efficiency, and in one embodiment, the query results table 540 is scanned in parallel with a DFS walk of the tree 300. As noted above, the metadata that was returned from the query has been stored in the query results table 540 in a particular order so that the metadata is in the same order as the order of the DFS walk. It will be appreciated that the metadata can be directly stored in the appropriate order, stored and then sorted into the order, or the like. In an embodiment, one leaf node of the tree 300 is initialized from each row of the query results table 540. If the node to be initialized does not exist, it is created, as was discussed above in connection with steps 407-411 of FIG. 4.

It will be appreciated that because an embodiment is adapted to return metadata for an entire level of the tree 300, as was discussed above in connection with FIG. 3C, the initialization of the tree 300 takes place in an order that intuitively is the reverse order in which a pyramid is built, top to bottom. In other words, a level of the tree 300 is not populated until the parent level is populated. As may be appreciated, an embodiment employs such a procedure for efficiency purposes. For example, if the population of a level of the tree 300 were skipped, a query pertaining to that level's children would also return information about the parent objects. Such objects would thus need to be created anyway. Skipping a level slows the process because inserting an object into a collection that already exists is less efficient than creating an entire child collection.

Thus, a method and system for modifying the behavior of an electronic device based on the presence of a remote device has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type, number or configuration of electronic devices in any type of environment. Therefore, the present invention should not be limited to any single embodiment, but rather should be construed in breadth and scope in accordance with the appended claims.

What is claimed is:

1. A method of populating and utilizing a data object tree corresponding to a database having a predefined schema that defines the database, the data object tree describing the database according to a number of levels of data objects, each data object in each level comprising metadata describing a corresponding element of the database, and having a known type of child data object in a next level, the method comprising:
    issuing a single query for each level of the data object tree with regard to every data object in the level to retrieve metadata from the database corresponding to every child data object of every data object in the level, the issued single query for a particular level being based on the known type of child data object of each data object in the particular level;
    storing the retrieved metadata as data in a table, wherein:
        the data is stored in the table in a predetermined order; and
        all objects of a same type are stored in a same table and are obtainable with a same query;
    reading the data from the table in the predetermined order;
    identifying a location of a data object in the data object tree that corresponds to the data read from the table;
    initializing the located data object with the read data;
    custom-generating a creation script using the initialized data object;
    applying the custom-generated creation script to recreate the schema of the database; and
    transferring metadata for the database from a development server to a production server in accordance with the recreated schema.

2. The method of claim 1, wherein the data corresponding to each data object of a predetermined object type is metadata.

3. The method of claim 1, wherein said identifying step is preformed in the predetermined order.

4. The method of claim 2, wherein said reading and identifying steps are performed concurrently.

5. The method of claim 1, wherein the predetermined order corresponds to a depth-first search walk of the data object tree.

6. The method of claim 1, further comprising creating the data object that corresponds to the data read from the table if the data object does not exist at the location.

7. The method of claim 1, wherein the data is retrieved from a relational data store.

8. The method of claim 7, wherein the data describes a relational database structure.

9. The method of claim 1, wherein the query is issued using SQL.

10. The method of claim 1, further comprising accessing the initialized data object with an object-oriented program.

11. A method of populating and utilizing a data object tree corresponding to a database having a predefined schema that defines the database, the data object tree describing the database according to a number of levels of data objects, each data object in each level comprising metadata describing a corresponding element of the database, and having a known type of child data object in a next level, the method comprising:
    issuing a single query to a relational data store for each level of the data object tree with regard to every data object in the level to retrieve metadata corresponding to every child data object of every data object in the level, the issued single query for a particular level being based on the known type of child data object of each data object in the particular level;
    storing the retrieved metadata in a table in a predetermined order;
    reading the metadata from the table in the predetermined order and concurrently locating one of the data objects;
    initializing the located data object with the read metadata;
    custom-generating a creation script using the initialized data object;
    applying the custom-generated creation script to recreate the schema of the database; and
    transferring metadata for the database from a development server to a production server in accordance with the recreated schema.

12. The method of claim 11, further comprising creating the data object prior to said initializing step.

13. The method of claim 11, wherein the data object tree represents a structure of at least a portion of a relational database.

14. The method of claim 11, wherein the initialized data object is accessible to an object-oriented program.

15. The method of claim 11, wherein the metadata describes a structure of a plurality of relational database entries.

16. A method for populating and utilizing a data object tree corresponding to a database having a predefined schema that defines the database, the data object tree describing the database according to a number of levels of data objects, each data object in each level comprising metadata describing a corresponding element of the database, and having a known type of child data object in a next level, the method comprising:
    issuing a single query for each level of the data object tree with regard to every data object in the level to obtain metadata corresponding to every child data object of every data object in the level, the issued single query for a particular level being based on the known type of child data object of each data object in the particular level;
    storing the obtained metadata in a table, wherein the metadata is arranged in an order corresponding to the order in which the tree is to be populated;
    reading the metadata from the table in the order;
    locating a data object in the data object tree;
    initializing the located data object with the read metadata;
    custom-generating a creation script using the initialized data object;
    applying the custom-generated creation script to recreate the schema of the database; and
    transferring metadata for the database from a development server to a production server in accordance with the recreated schema.

17. The method of claim 16, wherein said locating step takes place according to the order.

18. The method of claim 16, wherein the level of the data object tree contains data objects of a single type.

19. A method to create an object-oriented database structure from a relational database structure and to utilize the created object-oriented database structure, the object-oriented database structure comprising a data object tree corresponding to a database having a predefined schema that defines the database, the data object tree describing the database according to a number of levels of data objects, each data object in each level comprising metadata describing a corresponding element of the database, and having a known type of child data object in a next level, the method comprising:

querying a relational data store to obtain metadata describing the relational database structure, the querying comprising issuing a single query for each level of the data object tree with regard to every data object in the level to retrieve metadata from the database corresponding to every child data object of every data object in the level, the query for a particular level being based on the known type of child data object of each data object in the particular level;

storing the retrieved metadata in a table in a predetermined order;

reading the metadata from the table in the predetermined order and concurrently locating a data object in a data object tree;

initializing the located data object using the read metadata to create the object-oriented database structure;

custom-generating a creation script using the initialized data object;

applying the custom-generated creation script to recreate the schema of the database; and transferring metadata for the database from a development server to a production server in accordance with the recreated schema.

20. The method of claim 19, wherein the predetermined order corresponds to locating the data object in a depth-first search order.

21. A computer-readable storage medium having computer-executable instructions stored thereon to perform a method of populating and utilizing a data object tree corresponding to a database having a predefined schema that defines the database, the data object tree describing the database according to a number of levels of data objects, each data object in each level comprising metadata describing a corresponding element of the database, and having a known type of child data object in a next level, the method comprising:

issuing a single query for each level of the data object tree with regard to every data object in the level to retrieve metadata from the database corresponding to every child data object of every data object in the level, the issued single query for a particular level being based on the known type of child data object of each data object in the particular level;

storing the retrieved metadata as data in a table, wherein the data is stored in the table in a predetermined order;

reading the data from the table in the predetermined order;

identifying a location of a data object in the data object tree that corresponds to the data read from the table;

initializing the located data object with the read data;

custom-generating a creation script using the initialized data object;

applying the custom-generated creation script to recreate the schema of the database; and transferring metadata for the database from a development server to a production server in accordance with the recreated schema.

22. The computer-readable storage medium of claim 21, wherein the data corresponding to each data object of a predetermined object type is metadata.

23. The computer-readable storage medium of claim 21, wherein said identifying step is preformed in the predetermined order.

24. The computer-readable storage medium of claim 22, wherein said reading and identifying steps are performed concurrently.

25. The computer-readable storage medium of claim 24, wherein the predetermined order corresponds to a depth-first search walk of the data object tree.

26. The computer-readable storage medium of claim 21, wherein the method further comprises creating the data object that corresponds to the data read from the table if the data object does not exist at the location.

27. The computer-readable storage medium of claim 21, wherein the data is retrieved from a relational data store.

28. The computer-readable storage medium of claim 27, wherein the metadata describes a relational database structure.

29. The computer-readable storage medium of claim 21, wherein the query is issued using SQL.

* * * * *